UNITED STATES PATENT OFFICE 2,467,280

DI(ARYL SULFONYL) PEROXIDES AS LATENT CURING CATALYSTS FOR ACID-CURING THERMOSETTING MATERIALS

Henry A. Walter, Longmeadow, Mass., assignor to Monsanto Chemical Company, St. Louis, Mo., a corporation of Delaware No Drawing. Application March 29, 1946, Serial No. 658,219

6 Claims. (Cl. 260—67.6)

This invention relates to thermosetting compositions comprising acid curing thermosetting resins and novel latent curing catalysts.

The acid curing thermosetting resins of this invention are thermosetting compositions which can be molded under heat and pressure to provide insoluble, infusible finished articles. It has been found desirable to add to the thermosetting compositions an acid catalyst to speed the final hardening of the material and thus substantially shorten the molding cycle.

It has further been found that catalysts active under all conditions are not suitable for incorporation in the compositions of this invention since they cause the materials to harden or cure during storage and impart undesired properties to the finished articles.

To overcome these difficulties, the art has turned to the use of catalysts of the latent type, i. e., catalysts which remain inactive until heated with the resinous compositions to molding temperatures. Many of the latent catalysts used heretofore have been deficient in one or more of the properties required, i. e., they have either under-catalysed or over-catalysed the reaction and when used in quantities sufficient to modify their reactivity, have imparted undesired properties to the finished article such as a decrease in electrical resistance, an increase in moisture absorption, an increase in the color or a decrease in weather resistance.

One object of this invention is to provide latent catalysts for admixture with acid curing thermosetting resins.

Another object is to provide latent catalysts for admixture with amino-aldehyde reaction products which will promote the cure of the reaction products without impairing the properties of the finished product.

These and other objects are attained by admixing a di(aryl sulfonyl) peroxide with acid curing thermosetting resins.

The following examples are given in illustration and are not intended to limit the scope of this invention. Where parts are mentioned they are parts by weight.

Example I 100 parts of liquid urea-formaldehyde reaction product were added to 85 parts of alpha cellulose. The materials were mixed until the liquid resin was uniformly absorbed by the cellulose. This mixture was then dried until essentially free of water in a ventilated oven at 150° F. This dried composition was ground in a ball mill with 0.75% of di(p-toluene sulfonyl) peroxide. The powder was molded into a disc at 150° C. and 4000 p. s. i. for 75 seconds. The product had a brilliant surface and showed very low water absorption. The molding powder was stable in storage indefinitely.

Example II 100 parts of a melamine-formaldehyde reaction product in the fusible state were mixed with 0.5 part of di(p-toluene sulfonyl) peroxide and ground to form a homogeneous molding powder. 70 parts of walnut shell flour were intimately mixed with the ground up resin and catalyst in a ball mill. The resulting composition was stable in storage and could be molded without difficulty under conventional molding conditions to provide a dimensionally stable article having exceptional electrical properties.

Example III 80 parts of alpha cellulose were impregnated with 120 parts of fusible urea-melamine-formaldehyde reaction product. The material was dried and ground in a ball mill together with one part of zinc stearate as a mold lubricant and 0.5 part of di-(p-toluene sulfonyl) peroxide. The resultant molding powder was stable in storage and cured rapidly under conventional molding conditions.

The catalysts of this invention may be represented by the formula

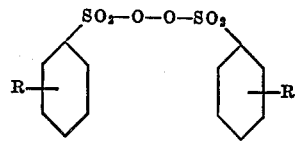

wherein R is hydrogen or an aliphatic, aromatic or cyclic radical, for example, di(2-methyl benzene sulfonyl) peroxide, di(4-ethyl-benzene sulfonyl) peroxide, di(2,4-dimethyl benzene sulfonyl) peroxide, di($\beta$-naphthalene sulfonyl) peroxide, di(isopropyl-$\beta$-naphthalene sulfonyl) peroxide, di(anthracene sulfonyl) peroxide, di(4-cyclohexyl benzene sulfonyl) peroxide, etc.

The di(aryl sulfonyl) peroxides have been described in the literature and are now being produced in commercial quantities in the United States. The simplest of the compounds, i. e., di(aryl sulfonyl) peroxides of the above formula in which R is hydrogen was described along with a method for making it by Weinland and Lewkowitz in Berichte 36, 2702.

The amino-aldehyde reaction products which may be catalysed with the di(aryl sulfonyl) peroxides are products of the reaction of various aldehydes with various amino compounds and their derivatives. The amino and amido compounds which may be used include urea, thiourea, aminotriazines, aminodiazines, mixtures of the above, and derivatives of the above such as alkylol ureas, alkylol aminotriazines, ethers of alkylol ureas, ethers of alkylol aminotriazines, etc.

The di(aryl sulfonyl) peroxides are solid white materials stable to decomposition at ordinary temperatures. When used as latent curing catalysts for amino-aldehyde reaction products, they have the unexpected property of resisting the action of heat for a short time and then break down relatively slowly to provide the acid conditions requisite to curing the resins. This property is of particular advantage for producing large moldings since it provides an opportunity to heat, uniformly, large amounts of the molding powder before the curing starts with the result that a more uniform and homogeneous cure is obtained.

In place of the alpha cellulose and nut shell fibers described in the examples, other fillers such as macerated fabric, wood flour, etc., may be used. Other conventional modifiers such as lubricants, pigments, dyes, etc., may also be incorporated in the compositions of this invention.

The amount of the di(aryl sulfonyl) peroxides used to accelerate the cure of the acid curing thermosetting resins may be varied from about 0.1 to about 1.0 part per 100 parts of the resin, depending in part, on the speed of cure desired. While greater amounts may be used, no improved results are obtained by virtue of the excess catalyst.

The use of the di(aryl sulfonyl) peroxides as latent catalysts for acid curing thermosetting resins does not advance the cure of the resins during storage, but accelerates their cure under conventional molding conditions without adversely affecting the physical and electrical properties of the molded products.

The di(aryl sulfonyl) peroxides are also efficient polymerization catalysts for polymerizable unsaturated organic compounds such as vinyl compounds, including vinyl esters, vinyl ethers, vinyl halides, etc.; acrylic compounds including esters, ethers, amides, nitriles, etc., of acrylic and alpha substituted acrylic acids; vinylidene compounds, styrene and styrene derivatives such as 4-methyl styrene and other alkyl-substituted styrenes; dienes such as butadiene and its derivatives; or mixtures of two or more of the above mentioned unsaturated compounds. They are particularly valuable as polymerization catalysts for those unsaturated compounds which require acid conditions for optimum polymerization such as p-methyl styrene, 2,4-dimethyl styrene, p-methyl alpha methyl styrene, etc.

It is obvious that many modifications and variations in the processes and compositions described above may be made without departing from the spirit and scope of this invention as defined in the appended claims.

What is claimed is:

1. A molding composition which is substantially stable at normal temperatures comprising an acid-curing thermosetting resin taken from the group consisting of aminotriazine-aldehyde resins, aminodiazine-aldehyde resins, urea-aldehyde resins and thiourea-aldehyde resins and from 0.1 to 1.0% by weight of a di(aryl sulfonyl) peroxide.

2. A molding composition which is substantially stable at normal temperatures comprising an acid-curing melamine-aldehyde resin and from 0.1 to 1.0% by weight of a di(aryl sulfonyl) peroxide.

3. A molding composition which is substantially stable at normal temperatures comprising an acid-curing urea-aldehyde resin and from 0.1 to 1.0% by weight of a di(aryl sulfonyl) peroxide.

4. A molding composition comprising an acid-curing thermosetting melamine-aldehyde resin and from 0.1 to 1.0% by weight of di(p-toluene sulfonyl) peroxide.

5. A molding composition comprising an acid-curing thermosetting urea-aldehyde resin and from 0.1 to 1.0% by weight of di(p-toluene sulfonyl) peroxide.

6. A molding composition comprising an acid-curing thermosetting resin taken from the group consisting of aminotriazine-aldehyde resins, aminodiazine-aldehyde resins, urea-aldehyde resins and thiourea-aldehyde resins and from 0.1 to 1.0% by weight of di(p-toluene sulfonyl) peroxide.

HENRY A. WALTER.

REFERENCES CITED

The following references are of record in the file of this patent:

UNITED STATES PATENTS

| Number | Name | Date |
|---|---|---|
| 2,056,456 | Howald | Oct. 6, 1936 |
| 2,058,315 | Huttenlocher et al. | Oct. 20, 1936 |